United States Patent [19]
Buttery et al.

[11] Patent Number: 5,064,673
[45] Date of Patent: Nov. 12, 1991

[54] COOKED TOMATO FLAVOR COMPOSITION

[75] Inventors: Ronald G. Buttery, El Cerrito; Roy Teranishi, Kensington; Louisa C. Ling, El Cerrito; Jean G. Turnbaugh, Berkeley, all of Calif.

[73] Assignee: The United States of America as represented by the Secretary of Agriculture, Washington, D.C.

[21] Appl. No.: 629,903

[22] Filed: Dec. 19, 1990

[51] Int. Cl.$^5$ .............................................. A23L 1/226
[52] U.S. Cl. .................................. 426/534; 426/535; 426/538
[58] Field of Search ..................... 426/534, 535, 538

[56] References Cited

U.S. PATENT DOCUMENTS 3,826,851 7/1974 Gaudagni et al.

OTHER PUBLICATIONS

M. Petro—Turza, "Flavor of Tomato and Tomato Products," *Food Reviews International* 2: 311–353 (1986).

R. Teranishi, R. G. Buttery and F. Shahidi, "Fresh Tomato Volatiles," *Flavor Chemistry: New Trends and Developments*, ACS Symposium Series 388, American Chemical Society, Washington, DC (1989).

R. G. Buttery, R. Teranishi, L. C. Ling, R. A. Flath, and D. J. Stern, "Quantitative Studies on Origins of Fresh Tomato Aroma Volatiles," *Journal of Agricultural and Food Chemistry*, 36: 1247–1250 (1988).

R. G. Buttery, R. Teranishi and L. C. Ling, "Identification of Damascenone in Tomato Volatiles," *Chemistry, and Industry*, 1988: 238.

R. G. Buttery, R. M. Seifert, D. G. Gaudagni, and L. C. Ling, "Characterization of Additional Volatile Components of Tomato," *Journal of Agricultural and Food Chemistry*, 19, 524–529 (1971).

J. C. Miers, "Formation of Volatile Sulfur Compounds in Processed Tomato Products," *Journal of Agricultural and Food Chemistry* 14: 420–423 (1966).

D. G. Guadagni and J. C. Miers, "Statistical Relationship between Methyl Sulfide Content and Aroma Intensity in Canned Tomato Juice," *Food Technology*, 23: 101–103 (1969).

H. J. Wobben, P. J. deValois, R. Ter Heide, H. Boelens and R. Timmer "Investigation into the Composition of a Tomato Flavour," *Proceedings, IV International Congress on Food Science and Technology*, Madrid, vol. 1, pp. 22–28 (1974).

T.—Y Chung, F. Hayase and H. Kato, "Volatile Components of Ripe Tomatoes and Their Juices, Purees and Pastes," *Agric. Biol. Chem.* 47: 343–351 (1983).

S. J. Kazeniac and R. M. Hall, "Flavor Chemistry of Tomato Volatiles," *Journal of Food Science* 35: 519–530 (1970).

V. Sieso and J. Crouzet, "Tomato Volatile Components Effect of Processing," *Food Chemistry* 2: 241–252 (1977).

*Primary Examiner*—Joseph Golian
*Attorney, Agent, or Firm*—M. Howard Silverstein; John D. Fado; Margaret A. Connor

[57] ABSTRACT

A composition containing the compounds dimethyl sulfide, beta-damascenone, 3-methylbutanal, and 3-methylbutyric acid in particular proportions is used to impart or enhance the cooked tomato flavor of food products. In a preferred embodiment, the composition also contains 1-nitro-2-phenylethane, eugenol, and methional.

4 Claims, No Drawings

COOKED TOMATO FLAVOR COMPOSITION

BACKGROUND OF THE INVENTION

1. Field of the Invention

The invention relates to a novel combination of compounds and the use of this composition for enhancing or imparting cooked tomato flavor to food products.

2. Background Art

The tomato processing industry is one of the largest in the food area. A major portion of the tomato crop in California is converted to tomato paste. This forms a relatively stable concentrated form of processed tomato that can be marketed in this form or used in the preparation of a great variety of processed tomato products such as tomato sauce, spaghetti sauce, pizza sauce, steak sauce, tomato soup, tomato juice, and ketchup. In addition to tomato paste, other forms of processed tomatoes are used in food products. For example, dehydrated tomatoes are used in soups, spaghetti sauce, and the like.

In the food industry it is well recognized that flavor and aroma play a critical role in the value of food products for consumption. It is also recognized by those skilled in the art of food flavors that aroma is responsible for the major part of flavor (see *Progress In Flavor Research*, Ed. D. G. Land and H. E. Nursten, Applied Science Publishers Ltd., London (1979), page 53).

Desirable cooked tomato flavor and aroma is that associated with high quality tomato paste. Difficulties in consistently obtaining such flavor and aroma are due to: (1) variations in raw materials, (2) loss of flavor and aroma volatiles during processing steps, e.g., heating, canning, freezing, or dehydration, and (3) loss of flavor during storage. As a consequence, a processed tomato food product may be lacking in the desired cooked tomato flavor.

Tomato aroma volatiles comprise a complex mixture of components which provide the characteristic odor and flavor of tomatoes. A review article by M. Petro-Turza (*Food Reviews International* 2:311–353 (1986)) lists over 400 compounds that have been identified in the volatiles of tomato and tomato products. During the processing of tomatoes, changes in the composition of tomato volatiles occur. J. C. Miers (*Journal of Agricultural and Food Chemistry* 14: 420–423 (1966)) and Guadagni and Miers (*Food Technology* 23: 101–103 (1969)) reported increases in dimethyl sulfide during the heat treatment of tomatoes and provided evidence of the importance of dimethyl sulfide to tomato juice aroma. R. G. Buttery et al. (*Journal of agricultural and Food Chemistry* 19: 524–529 (1971)) listed 100 compounds identified in tomato volatiles with some certainty and characterized additional volatile components of fresh and heated tomatoes. The researchers concluded that no single or small group of compounds is entirely responsible for the characteristic aroma of fresh or cooked tomatoes.

SUMMARY OF THE INVENTION

We have surprisingly discovered that a composition containing the compounds dimethyl sulfide, beta-damascenone, 3-methylbutanal, and 3-methylbutyric acid in particular proportions provides a flavoring composition which can be used to enhance or impart desirable cooked tomato flavor and aroma to a food product. In a preferred embodiment, the composition contains one or more of the following additional compounds: 1-nitro-2-phenylethane, eugenol, and methional.

In accordance with this discovery, it is an object of the invention to provide a flavoring composition which can be used to enhance or impart cooked tomato flavor and aroma to a food product.

A further object of the invention is the addition of the unique flavoring composition to a food product in an amount sufficient to enhance or impart cooked tomato flavor to the product.

Other objects and advantages of the invention will become readily apparent from the ensuing description.

DETAILED DESCRIPTION OF THE INVENTION

The flavoring composition of the invention contains the compounds dimethyl sulfide, beta-damascenone, 3-methylbutanal, and 3-methylbutyric acid in the proportions given in Table 1 below. In a preferred embodiment, the composition contains one or more of the additional compounds 1-nitro-2-phenylethane, eugenol, and methional in the proportions given in Table 1. In the most preferred embodiment, the composition of the invention is made up of all seven compounds in the proportions given in Table 1.

The compounds in the order listed in Table 1 are most preferably employed in the following proportions: 140:1:1.7:140:5:7.1:2.1. Other compounds which do not adversely affect the cooked tomato flavor of the composition may be added to the composition. Such additional compounds include, for example, beta-ionone, 6-methyl-5-hepten-2-one, phenylacetaldehyde, and linalool.

TABLE 1

| Compound | Parts by volume |
| --- | --- |
| Dimethyl sulfide | 112–168 |
| Beta-damascenone | 0.8–1.2 |
| 3-methylbutanal | 1.4–2.0 |
| 3-methylbutyric acid | 112–168 |
| 1-nitro-2-phenylethane | 4.0–6.0 |
| eugenol | 5.7–8.4 |
| methional | 1.7–2.5 |

The components of the cooked tomato flavor composition, hereinafter referred to as CTF (cooked tomato flavor), have the following structures:

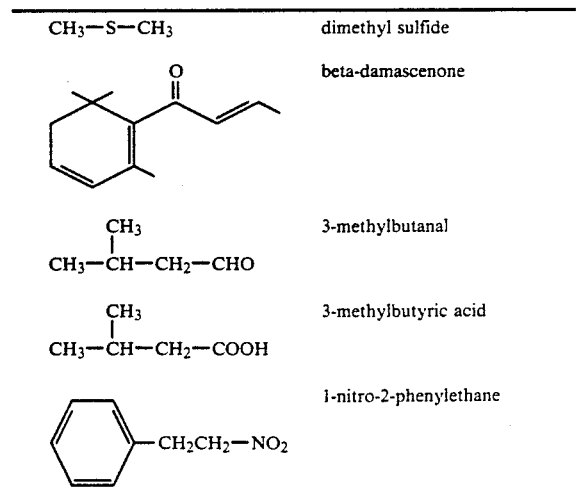

-continued

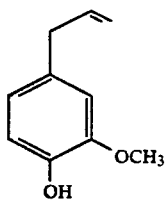
eugenol

methional
(3-methylthiopropanal)

Most of the compounds are available from commercial sources (see Example 1, below). Synthesis procedures are well known for dimethyl sulfide, beta-damascenone, 3-methylbutanal, 3-methylbutyric acid, eugenol, and methional. 1-Nitro-2-phenylethane can be synthesized by the method of Kornblum et al. (*Journal of the American Chemical Society* 78: 1497 (1956)) as described by Buttery et al. in *Flavor Chemistry: Trends and Developments*, ACS Symposium Series No. 388, 1989, page 215. Some of the compounds, e.g., 3-methylbutanal, 3-methylbutyric acid, and eugenol can be obtained from natural sources.

CTF exhibits an intense aroma associated with cooked tomato. For the purposes of this invention, the phrase "cooked tomato flavor" refers to the flavor and aroma of heat-treated tomato products such as tomato paste and tomato sauce, the common commercial forms of cooked tomato. It should be noted that none of the individual components of CTF exhibit the flavor or aroma of cooked tomato or the flavor or aroma of CTF. Rather it is the unique combination of these components in the above-mentioned proportions which produces the desired cooked tomato flavor and aroma.

Another surprising aspect is that while hundreds of compounds have been reported in tomato volatiles, the four-component mixture (and preferably seven-component mixture) described above provide a flavoring agent which provides the flavor and aroma of cooked tomato.

In using CTF as a flavoring agent, it is incorporated in the food product using standard procedures known to those in the art. Because of its intense flavoring value, CTF is ordinarily diluted with a carrier. Dilution with a carrier is also beneficial to increase the bulk of CTF so that small amounts of the composition may be accurately metered into a food. As the diluent, one may use carriers which are suitable for food use such as water, ethyl alcohol, glycerol, and edible fats or oils to form a liquid CTF concentrate. We have found that water is a convenient carrier. A solution of 0.008 to 0.1% CTF, and preferably 0.08% CTF, in water is convenient. This solution is very stable. Alternatively, CTF may be encapsulated in edible carriers, e.g., gelatin, using known technology. The encapsulated material can be mixed with substrates such as starch, sugar, citric acid, corn syrup solids, corn starch, anti-caking agents or other non-toxic substances compatible with the material to be flavored or seasoned.

The flavoring composition finds several uses. One important use is to enhance the flavor of food products which contain processed tomatoes, such as tomato paste-based products. As discussed above, the flavor and aroma of processed tomato products can vary due to variation in raw materials, processing conditions, and storage. CTF is useful to provide processed tomato products which consistently have high quality cooked tomato flavor and aroma. Exemplary of processed tomato products are spaghetti and pizza sauces, tomato soup, ketchup, and food products which contain dehydrated tomatoes. As illustrated in Example 1, below, a test panel rated CTF as having an aroma similar to high quality tomato sauce. As illustrated in Example 2, below, a majority of the test panel rated soup and spaghetti sauce with added CTF as having a better aroma than the unsupplemented product.

Another important use of the flavor composition of the invention is addition of CTF to a non-tomato-containing food product to impart cooked tomato flavor to the food. Exemplary of such food products are salad dressings, marinades, corn chips, hamburger, meat loaves, gravies, stews, and soups.

Another use of the flavor composition of the invention is to prepare a seasoning agent by formulating CTF with suitable carriers, spices, and additives. The seasoning formulation can be sprinkled on foods to enhance or impart cooked tomato flavor.

In practice, CTF, alone or in combination with diluents, carriers, or other additives which do not adversely affect the cooked tomato flavor, is used in an amount effective to obtain the desired flavor or seasoning. We have found that addition of CTF to a food product to provide a concentration of dimethyl sulfide in the final product of about 0.2 to 20 parts per million (ppm) and preferably 0.5 to 10 ppm generally provides a food product with desirable cooked tomato flavor. Higher concentrations give more intense flavor. It is obvious, however, that the effective concentration of CTF is that which provides the desired flavor level for the food product in question.

It is within the compass of the invention to use CTF in combination with other flavoring agents. For example, one may mix a carrier with CTF and with a known flavoring agent such as salt, monosodium glutamate, onion powder, garlic powder, black pepper, paprika, or dried herbs such as parsley, oregano, celery, and sage.

EXAMPLES

The following examples are intended only to further illustrate the invention and are not intended to limit the scope of the invention which is defined by the claims.

EXAMPLE 1

Materials and Methods. Dimethyl sulfide, 3-methylbutanal, eugenol, methional, and 3-methylbutyric acid were obtained from Aldrich Chemical Company, Wisconsin, USA. Beta-Damascenone was obtained from Firmenich SA, CH-1211, Geneva 8, Switzerland. 1-Nitro-2-phenylethane was synthesized by the method of Kornblum et al. (*Journal of the American Chemical Society* 78: 1497 (1956) as described by Buttery et al. in *Flavor Chemistry: Trends and Developments*, ACS Symposium Series No. 388, 1989, page 215.

A concentrate of CTF in water was made up by adding a measured amount of each component to a measured amount of sterile odor-free distilled water in a pyrex glass container which was then stoppered and vigorously agitated until dissolved. The concentrate contained 0.084% CTF which amounts to 400 ppm of dimethyl sulfide, 2.8 ppm beta-damascenone, 4.8 ppm 3-methylbutanal, 14 ppm 1-nitro-2-phenylethane, 20 ppm eugenol, 6.0 ppm methional, and 400 ppm 3-methylbutyric acid. All measurements were based on volume and figures are given to two places.

Aroma Evaluation. The quality of the aroma of a solution of CTF prepared from the concentrate was evaluated using two main panel method which are discussed below. The first used a panel of 17-22 judges. The judges were asked to rate (on a scale of 1-5) the aroma of a solution of CTF in water (at a concentration where dimethyl sulfide=2 ppm) in regard to its similarity to good quality tomato sauce. The rating system was such that 5=most similar to good quality tomato sauce and 1=not similar. Two good quality major brand commercial tomato paste samples were diluted 1:4 with water to give tomato sauces and compared alongside the diluted CTF solution. Containers used for the judgement were 250-ml Erlenmeyer flasks. The base of each flask was covered (on the outside) with red paper (chosen to resemble the color of tomato) and the flask (other than the opening) completely covered with aluminum foil to mask color differences (further masking was obtained by keeping the panel booths dimly lighted with 7 watt orange incandescent bulbs).

The flasks were marked with a code and the judges were unaware of the nature of each sample. The results are tabulated below.

| Sample | Average Similarity to Good Quality Tomato Sauce |
|---|---|
| CTF | 3.6 |
| Commercial Sample A | 3.7 |
| Commercial Sample B | 2.5 |

5 = most similar to good quality tomato sauce.
1 = least similar.
17-22 panel members with 39 total judgments.

A different method of comparison was also made in which the three samples described above were ranked. The ranking was such that 1=best tomato sauce aroma and 3=poorest tomato sauce aroma. The same samples, containers, and booths were used as for the first comparison. The results found are shown below.

| Sample | Average Rank |
|---|---|
| CTF | 1.8 |
| Commercial Sample A | 1.6 |
| Commercial Sample B | 2.5 |

1 = most similar to good quality tomato sauce aroma.
3 = least similar.
20-22 panel members with 42 total judgments.

Both studies showed that the panelists considered the CTF mixture to be about as good as the better quality major brand commercial sample and significantly better than the other major brand commercial sample.

EXAMPLE 2

Enhancement of Aroma of Commercial Tomato Products Using CTF

Sensory panel experiments were carried out to compare the aroma of commercial products which has CTF added to the aroma of the unchanged original product.

A. With Dehydrated "Instant" Soups.

The commercial "instant" soup was made up following the manufacturer's directions (one envelope to 180 ml of boiling water) and then cooled to room temperature. It was divided into two equal samples and each enclosed in a 125-ml Erlenmeyer flask. An amount (0.25 ml) of CTF concentrate (0.084% in water) was then added to one of the samples. The samples were then coded and submitted to the panelists who were asked to choose which sample had the best aroma.

In comparison with such a soup labeled "Tomato and Herb" with 21 judges 100% chose the sample with added CTF as having the best aroma.

In a second comparison with a soup labeled "Spring Vegetable" 73% of the 22 judges chose the sample with added CTF as having the best aroma.

B. With Spaghetti Sauce.

A spaghetti sauce labeled "Chunky Meat Flavored Spaghetti Sauce" was purchased from a local supermarket. Two 40 g samples of the sauce were taken and each enclosed in a 125-ml Erlenmeyer flask. A quantity of the 0.084% CTF (0.2 ml) was added to one of the samples. The flasks were coded and then submitted to the panelists who were asked to choose the sample with the best spaghetti sauce aroma. In 38 judgments (from 22 judges) the sample containing CTF was chosen 29 times (76%) to have the best aroma.

It is understood that the foregoing detailed description is given merely by way of illustration and that modification and variation may be made therein without departing from the spirit and scope of the invention.

Having thus described the invention, we claim:

1. A flavoring composition useful for enhancing or imparting a cooked tomato flavor to a food product, which consists of 112-168 parts dimethyl sulfide, 0.8-1.2 parts beta-damascenone, 1.4-2.0 parts 3-methylbutanal, and 112-168 parts 3-methylbutyric acid.

2. A flavoring composition useful for enhancing or imparting a cooked tomato flavor to a food product, which consists of 112-168 parts dimethyl sulfide, 0.8-1.2 parts beta-damascenone, 1.4-2.0 parts 3-methylbutanal, and 112-168 parts 3-methylbutyric acid and a suitable carrier therefor.

3. A flavoring composition useful for enhancing or imparting a cooked tomato flavor to a food product, which consists of 112-168 parts dimethyl sulfide, 0.8-1.2 parts beta-damascenone, 1.4-2.0 parts 3-methylbutanal, and 112-168 parts 3-methylbutyric acid and one or more of a compound selected from the group consisting of 4-6 parts 1-nitro-2-phenylethane, 5.7-8.4 parts eugenol, 1.7-2.5 parts methional, beta-ionone, 6-methyl-5-hepten-2-one, phenylacetaldehyde, and linalool.

4. A flavoring composition useful for enhancing or imparting a cooked tomato flavor to a food product, which consists 112-168 parts dimethyl sulfide, 0.8-1.2 parts beta-damascenone, 1.4-2.0 parts 3-methylbutanal, and 112-168 parts 3-methylbutyric acid and one or more of a compound selected from the group consisting of 4-6 parts 1-nitro-2-phenylethane, 5.7-8.4 parts eugenol, 1.7-2.5 parts methional, beta-ionone, 6-methyl-5-hepten-2-one, phenylacetaldehyde, and linalool, and a suitable carrier therefor.

* * * * *